United States Patent [19]
Takei

[11] Patent Number: 5,713,136
[45] Date of Patent: Feb. 3, 1998

[54] OBJECT MEASURING APPARATUS

[75] Inventor: Seiji Takei, Kanagawa, Japan

[73] Assignee: Nippon Thompson Co., Ltd., Tokyo, Japan

[21] Appl. No.: 544,875

[22] Filed: Oct. 18, 1995

[30] Foreign Application Priority Data

Oct. 19, 1994 [JP] Japan ................ 6-280028

[51] Int. Cl.$^6$ .................................................. G01B 7/04
[52] U.S. Cl. .............................. 33/501.03; 33/501.02
[58] Field of Search .................... 33/501.03, 708, 33/710, 712, 501.02, 501.04

[56] References Cited

U.S. PATENT DOCUMENTS

| | | | |
|---|---|---|---|
| 2,730,006 | 1/1956 | Gottschall | 33/501.03 |
| 2,875,524 | 3/1959 | Bower et al. | 33/708 |
| 4,528,756 | 7/1985 | Ichihara | 33/501.03 |
| 4,974,333 | 12/1990 | Ginzburg | 33/501.02 |

FOREIGN PATENT DOCUMENTS 2219664  12/1989  United Kingdom ............... 33/708

*Primary Examiner*—Christopher W. Fulton
*Attorney, Agent, or Firm*—Sughrue, Mion, Zinn, Macpeak & Seas, PLLC

[57] ABSTRACT

An object measuring apparatus for measuring the dimensions of an object, and controlling the pushing pressure of a probe that makes contact with the measured object. A table is movably mounted on a base member, a drive unit includes armature coils on the base member and a field magnet on the table, and a probe is fastened to the table and driven along the base member by the drive unit. A linear magnetic scale is provided on the base member, and a magnetic sensor portion is provided on the table. A measuring position detection sensor on the probe detects the object to be measured. An output from the measuring position detection sensor indicating that an object has been detected, and the pulse output generated by relative movement of the sensor portion and the scale, are supplied to a processing unit to calculate the dimensions of the object. The thrust of the probe is nearly proportional to the drive current supplied to the armature coils, so that the thrust of the probe unit can be controlled before determining the dimensions of the object.

14 Claims, 14 Drawing Sheets

OBJECT MEASURING APPARATUS

BACKGROUND OF THE INVENTION

1. Field of the Invention

The present invention relates to an object measuring apparatus that is able to measure the outer (outer shape) or inner (inner shape) dimensions of objects (products) transported by, for example, a belt conveyor. These objects may be solids or fluids, and include tangible objects for which the exterior can be measured as a result of packaging.

2. Description of the Prior Art

In general, in order to inspect whether or not the outer or inner dimensions of products continuously produced in large volume are within a specified range, all products produced or just those sampled products are measured for their outer or inner dimensions by a measuring apparatus. In the case the outer or inner dimensions deviate from the specified range, accommodations are made such as removing said product. In order to measure the outer or inner dimensions of this type of product, after temporarily stopping the transporting action by, for example, a belt conveyor when the product being transported reaches a measuring position, the outer or inner dimensions of the products are then measured while stopped. Alternatively, the outer or inner dimensions of products may also be measured while being continuously transported by the belt conveyor.

An example of this type of measuring apparatus of the prior art is classified into types in which outer or inner dimensions are measured optically or mechanically.

In this type of optical measuring apparatus of the prior art, there are cases in which this apparatus is composed of, for example, a projected light source and a sensor that receives the projected light from this projected light source. The boundary portion of the shadow of a product present in the projected light is extracted by the sensor and a device is employed that calculates the outer or inner dimensions of the products.

In addition, as another example of an optical measuring apparatus, the video signal of a product photographed by, for example, a television camera is converted into a binary signal, and a device is employed that calculates the outer diameter of the product based on this binary signal.

Moreover, as an example of a mechanical measuring apparatus, probes are brought into direct contact with both lateral surfaces of the product to be measured. By then calculating the distance between the probes while making contact with the product, a device is employed that attempts to determine the outer or inner dimensions of the product.

However, in the optical measuring apparatus of the prior art described above, even if a constitution is employed that combines a projected light source and sensor that receives the projected light from that projected light source, or even if a constitution is employed wherein the video signal obtained from a television camera is converted into a binary signal, the constitution of the attachment and positioning and so forth for performing measurement is complex. In addition, this type of measuring apparatus also has the disadvantages of the total cost of the apparatus increasing and a considerable amount of labor being required for initial setup and maintenance.

On the other hand, the mechanical measuring apparatus of the prior art has the characteristics of the constitution being simpler than the former optical measuring apparatus, the total cost of the apparatus being low, and the amount of labor required for initial setup and maintenance being able to be relatively reduced. However, in the case of the action of making direct contact with the measured object in the form of a product by probes, although a mechanical speed reducer such as a ball screw is used, since the amount of feeding ends up being set, control of the pushing pressure of the probes on the product is difficult, and depending on the case, there is the disadvantage of the product being damaged by excessive pushing force of the probes.

SUMMARY OF THE INVENTION

Therefore, in consideration of the above-mentioned problems of the prior art, the object of the present invention is to provide an object measuring apparatus that enables the pushing force (thrust) of the probes in a mechanical measuring apparatus to be suitably controlled to an arbitrary value by using a drive unit that uses a linear motor.

In order to achieve the above-mentioned object, the present invention is an object measuring apparatus comprising: a base member; a moving member mounted on this base member so as to be able to move with respect to the base member; a drive unit composed of armature coils and a field magnet arranged to as to magnetically couple the base member and moving member; a relative position detection unit arranged between the base member and moving member that outputs the relative position of the moving member with respect to the base member in the form of an electrical signal; a probe that measures the outer or inner dimensions of an object provided on said moving member; and, a processing unit that calculates the inner or outer dimensions of an object measured with said probe by driving operation by said drive unit based on the electrical signal output by said relative position detection unit.

In addition, the present invention also claims an object measuring apparatus comprising: a base member; two moving members mounted on this base member so as to be able to move with respect to the base member; a drive unit composed of armature coils and a field magnet arranged to as to magnetically couple the base member and moving members; relative position detection units arranged between the base member and two moving members that respectively output the relative position of the moving members with respect to the base member in the form of an electrical signal; 1st and 2nd probes arranged so as to respectively oppose said two moving members that measure the outer or inner dimensions of an object; and, a processing unit that calculates the inner or outer dimensions of an object measured with the 1st and 2nd probes by driving operation by said driving unit based on the electrical signal output by the respective relative position detection unit.

In addition, the present invention is composed so that the speed of a linear motor is reduced according to the command from a proximity sensor, and the linear motor is stopped by the processing unit as a result of judging that the probe has reached a prescribed measuring load after making contact with the object.

In the object measuring apparatus of the present invention, since driving is performed by a drive unit composed of armature coils and a field magnet arranged so that moving members provided so as to be able to move with respect to a base member are mutually and magnetically coupled, and is composed so as to arrange probes for measuring an object on said moving members, the pushing pressure (thrust) of the probes on the object to be measured can be suitably controlled at an arbitrary value by regulating the drive current to the armature coils. Moreover, in the object measuring apparatus of the present invention, since a relative position detection unit inherently equipped on a drive unit is used, in addition to measurement accuracy being improved, a measuring apparatus can be composed without using special apparatuses, thus enabling the measuring apparatus to be composed inexpensively.

In addition, since the object measuring apparatus as claimed in the present invention is composed so that the speed of a linear motor is reduced according to a command from a proximity sensor, and a processing unit judges that the probes have reached a prescribed measuring load after making contact with the object, even more precise measurement is possible.

DESCRIPTION OF THE PREFERRED EMBODIMENTS

Figure 1:
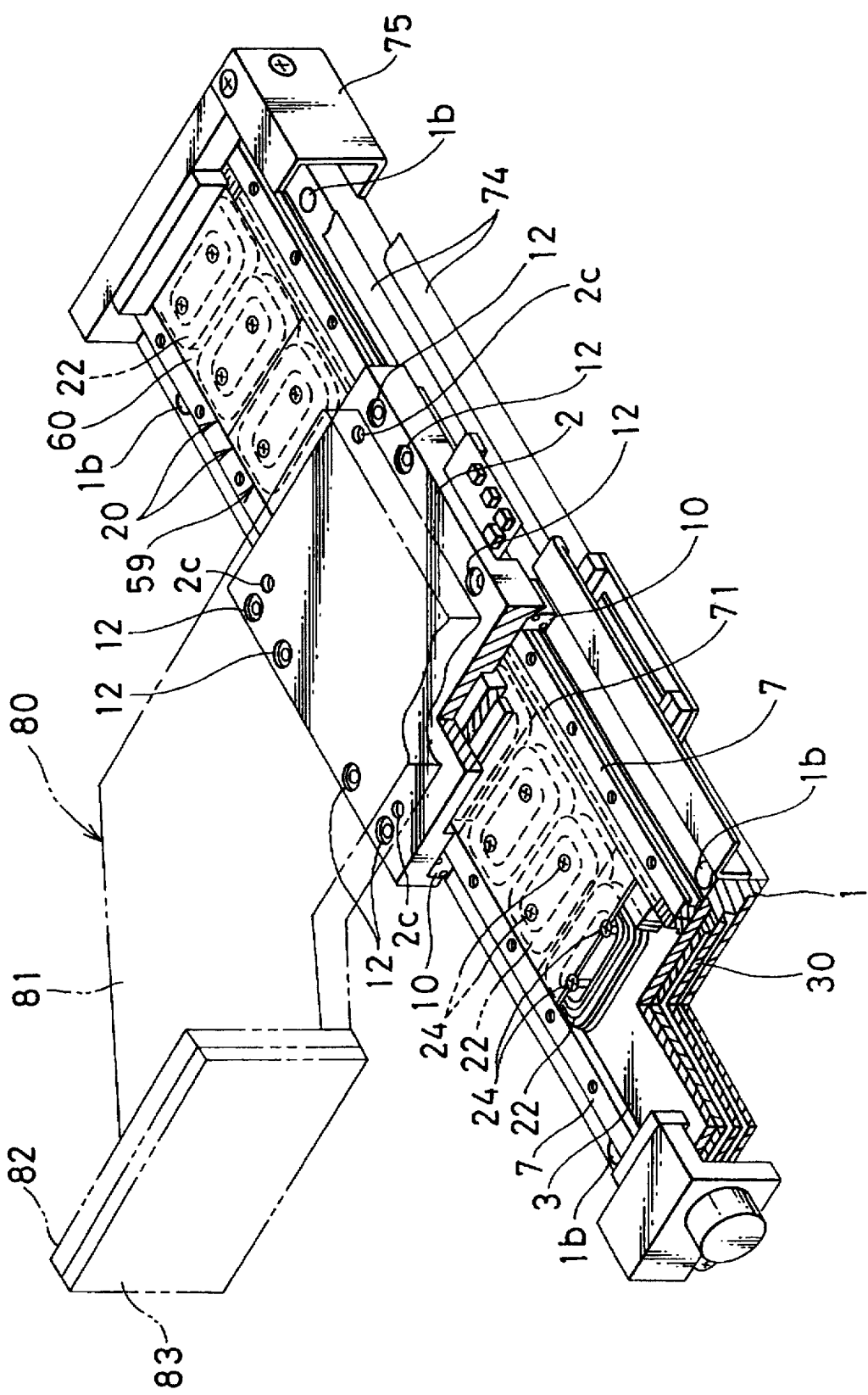
FIG. 1 is a perspective view, including a partial cross-section, of the drive unit used in the measuring apparatus of the present invention.

The following provides an explanation of the object measuring apparatus as claimed in the present invention based on the embodiments shown in the drawings. The basic constitution of the drive unit in this object measuring apparatus is a direct current linear motor, and the constitution of a first embodiment is explained using FIGS. 1 through 6. Said drive unit is composed by mutually adding a driving device in the form of a linear direct current motor, a moved object to be moved, namely a moving member to be described later in the form of a table, and a guiding device in the form of a guide unit, which together with supporting a probe and so forth mounted on this table, mutually guides the operation of the primary and secondary sides of said linear direct current motor. In the case of the present embodiment, although a moving magnet type of linear direct current motor is employed for the driving device, a moving coil type of linear direct current motor can naturally also be applied.

To begin with, the following provides an explanation of the above-mentioned guide unit.

Figure 2:
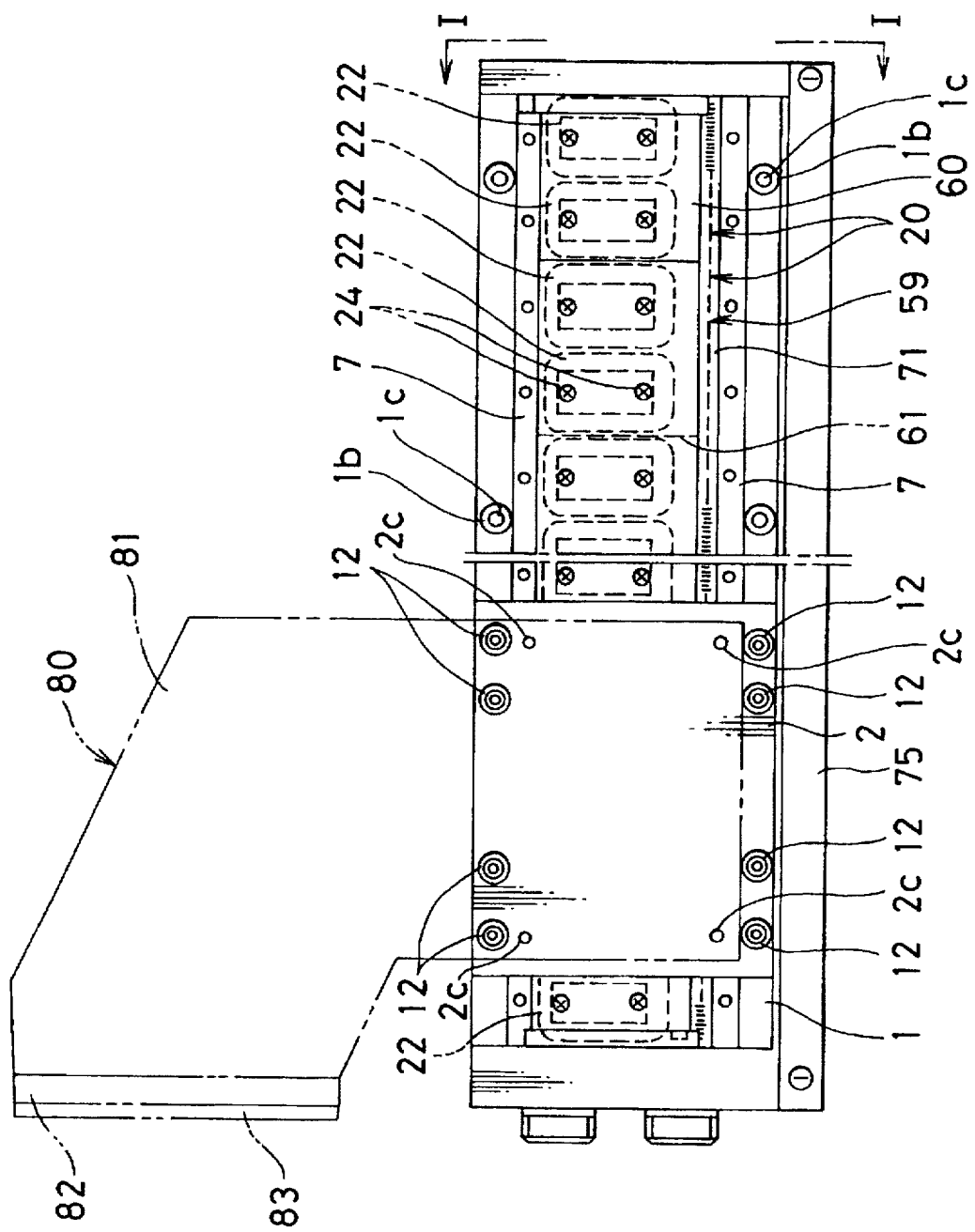
FIG. 2 is an overhead view of the drive unit shown in FIG. 1.
Figure 3:
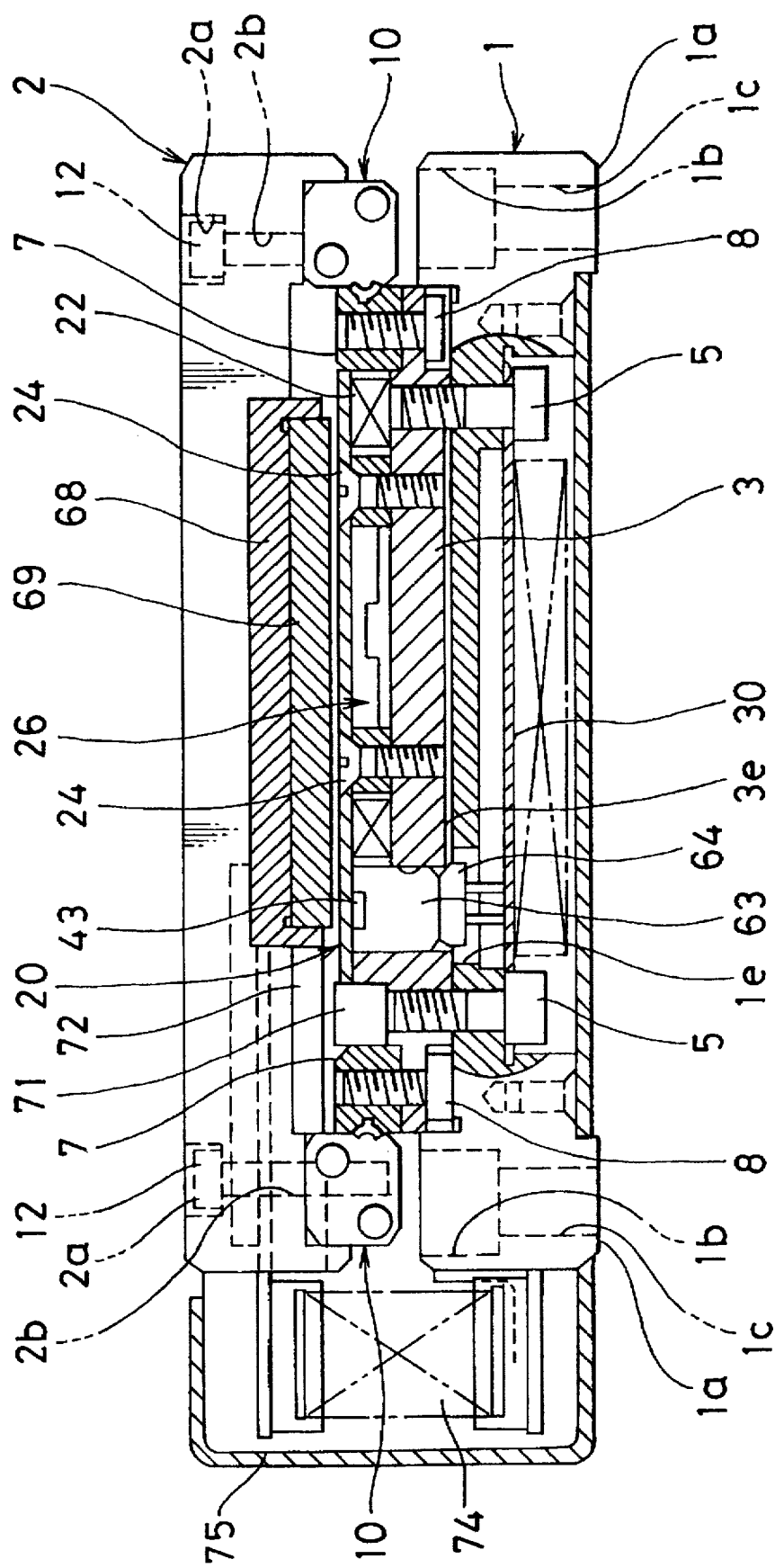
FIG. 3 is a cross-sectional view as viewed in the direction of the arrows from line I—I in FIG. 2.

As shown in FIGS. 1 through 3, this guide unit has a base member in the form of bed 1 formed into the overall shape of a rectangular plate, and a moving member in the form of table 2 to move along the lengthwise direction of said bed 1. As shown in FIGS. 1 and 3, coil yoke 3, formed into the shape of a rectangular plate and having nearly the same length as said bed 1, is arranged on the upper surface of bed 1, and is fastened to said bed 1 by a plurality of bolts 5 (with hexagon sockets, see FIG. 3).

Two track rails 7 are arranged on both sides of the upper surface of said coil yoke 3 along the lengthwise direction of said coil yoke 3, and are fastened to said coil yoke 3 by a plurality of flat head screws 8 (see FIG. 3).

Figure 4:
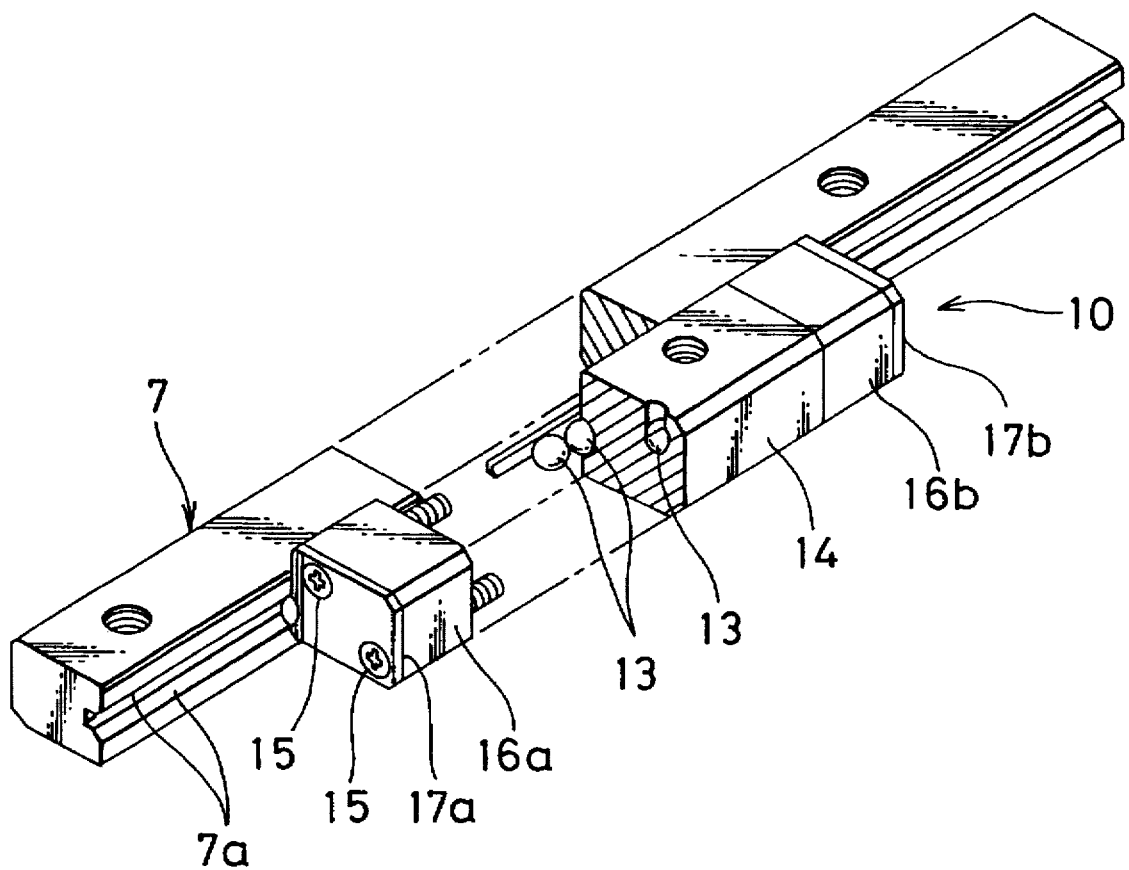
FIG. 4 is a perspective view, including a partial cross-section, of a track rail and slide member equipped on the drive unit shown in FIGS. 1 through 3.

As shown in FIG. 4, a track in the form of a single track groove 7a, having a roughly semi-circular shaped cross-section, is formed in the outside of the above-mentioned track rail 7. As is clear from FIGS. 1 and 3, a slider in the form of slide member 10, able to freely perform relative motion with respect to said track rail 7, is arranged on the outside of said track rail 7, and is fastened to the lower surface of table 2 by, for example, two bolts 12 (with hexagon sockets). Furthermore, as is clear from FIG. 3, countersunk portions 2a and insertion holes 2b are formed in table 2 into which the head portions and threaded portions, respectively, of bolts 12 are inserted. Bolts 12 are embedded in these countersunk portions 2a and insertion holes 2b, and do not protrude from the upper surface of table 2.

A rolling element circulating path (not shown) is formed in the above-mentioned slide member 10, and rolling elements in the form of a large number of balls 13 are arranged and contained within said rolling element circulating path. These balls 13 bear the load between track rail 7 and slide member 10 by circulating while rolling over track groove 7a of track rail 7 accompanying movement of slide member 10 with respect to track rail 7.

As shown in FIG. 4, the above-mentioned slide member 10 has a casing 14, a pair of end caps 16a and 16b coupled to both ends of said casing 14 by round head screws 15, and two seals 17a and 17b fastened to the outer surfaces of both of said end caps 16a and 16b. The above-mentioned rolling element circulating path is composed of a load bearing track groove and return path formed in casing 14 mutually in parallel and passing linearly through said casing 14 in its lengthwise direction, and a pair of roughly arc-shaped direction changing paths formed in both end caps 16a and 16b that connect both ends of said load bearing track groove and return path. Furthermore, said load bearing track groove opposes track groove 7a of track rail 7.

The guide unit of the constitution described above is fastened to a flat mounting surface equipped by a plurality of bolts (with hexagon sockets: not shown). Consequently, as shown in FIG. 3, bed 1 has flat mounting bottom surface 1a for anchoring to said mounting surface. As shown in FIGS. 1 through 3, countersunk portions 1b and insertion holes 1c are formed in both sides of bed 1 into which the head portions and threaded portions of the above-mentioned bolts for fastening said bed to a mounting surface (base) are respectively inserted. Said bolts are embedded in these countersunk portions 1b and insertion holes 1c, and do not protrude from the upper surface of bed 1. In addition, as shown in FIGS. 1 and 2, for example, four threaded holes 2c are formed in the four corners of the upper surface of table 2 able to move with respect to this bed 1, and probe unit 80 to be described later is fastened to said table 2 by bolts (not shown) that screw into these threaded holes 2c.

Continuing, the following provides a detailed description of the primary and secondary sides of the linear direct current motor that is mutually combined with the guide unit having the constitution described above.

Figure 5:
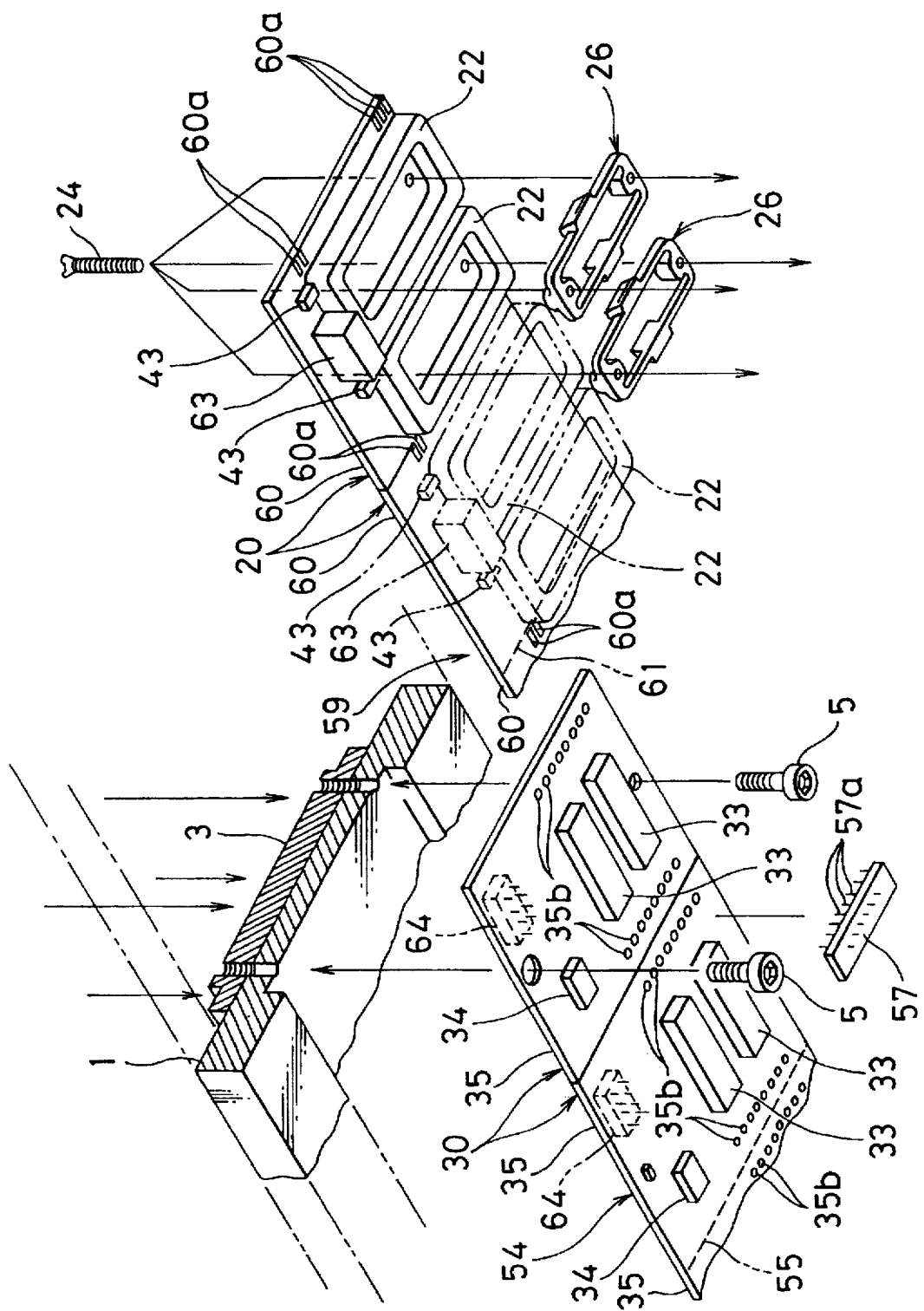
FIG. 5 is an exploded perspective view of the essential portion of the drive unit shown in FIGS. 1 through 3.

To begin with, as shown in FIGS. 1 through 3 and 5, the primary side has the previously described coil yoke 3 installed on bed 1, coil substrate 20 arranged along the lengthwise direction of coil yoke 3 on the upper surface of said coil yoke 3, and, for example, fourteen armature coils 22 supported by being affixed in a row along the direction in which the above-mentioned table 2 is to move on the lower surface of said coil substrate 20, namely the side of coil yoke 3. Furthermore, each armature coil 22 is wound into roughly the shape of a rectangular loop. In addition, as shown in FIGS. 3 and 5, Hall effect elements 43 are provided corresponding to each armature coil 22 on coil substrate 20.

Each of the above-mentioned armature coils 22 and coil substrate 20 is fastened together to coil yoke 3 with said coil substrate 20 on the outside by fastening members in the form of countersunk head screws 24, two each, for example, of which are inserted for each of said armature coils 22.

As shown in FIGS. 3 and 5, spacer assemblies 26 are juxtaposed between coil substrate 20, fastened by countersunk head screws 24, and coil yoke 3 into which said countersunk head screws 24 are screwed. These spacer assemblies 26 are provided so that deformation, such as warping and so forth, does not occur in coil substrate 20 caused by tightening of countersunk head screws 24, and are fit inside each armature coil 22.

Next, the following provides an explanation of the circuit substrate for performing supply of electricity and so forth to each of the above-mentioned armature coils 22.

As shown in FIGS. 1, 3 and 5, this circuit substrate 30 is arranged in parallel with coil substrate 20 on the lower surface of bed 1 on which said coil substrate 20 is installed on its upper surface with coil yoke 3 in between. Moreover, said circuit substrate 30 is fastened to said bed 1 by a plurality of bolts 5 (with hexagon sockets). Furthermore, these bolts 5 also serve to fasten the above-mentioned coil yoke 3 to bed 1.

As shown in FIG. 5, the above-mentioned circuit substrate 30 is composed by joining together a plurality of separate portions 35, each provided with a drive circuit composed of electronic components 33, 34 and so forth. These separate portions 35 are provided corresponding to each unit of two armature coils each of the fourteen armature coils 22 provided in a row. Thus, the number of these separate portions 35, in this case, is seven.

The drive circuit provided on each of the above-mentioned separate portions 35 contains one set of circuit portions supplying excitation current to a single armature coil, or in other words, contains a circuit corresponding to two armature coils.

Continuing, the following provides a detailed description of the separated constitution of the above-mentioned circuit substrate 30 and coil substrate 20 arranged above it.

To begin with, the following provides an explanation of circuit substrate 30.

In the case of fabricating this circuit substrate 30, a base substrate 54, having a base length (a portion is shown in FIG. 5), is made available. This base substrate 54 is composed of, for example, six separate portions 35, explained based on FIG. 5, joined into a single unit. As was previously described, these separate portions 35 are provided with a drive circuit that performs supply of electrical power and so forth to two armature coils 22 each grouped in the form of individual units. Furthermore, as shown in FIG. 5, marks in the form of broken lines 55 are printed on both the top and bottom surfaces of base substrate 54 (only those on the bottom surface are shown in the drawing) for distinguishing each separate portion 35.

Since the previously described circuit substrate 30 must link together seven of the above-mentioned separate portions 35, said circuit substrate 30 is completed by severing one of the six separate portions 35 possessed by the above-mentioned base substrate 54 along the above-mentioned broken line 55 to separate, arranging this separated separate portion 35 in a row at one end of unseparated base substrate 54 as shown in FIG. 5, and mutually connecting their corresponding connection terminals.

Furthermore, in FIG. 5, connection between the above-mentioned separated separate portions 35 and base substrate 54 is performed, for example, by a single connection component 57 having terminals 57a fit into through holes 35b provided in both connection terminal portions. Furthermore, although connection between corresponding connection terminal portions may be performed using copper wire and so forth, by performing connection using this type of connection component 57, in addition to connection being able to be performed all at once, connections are reinforced due to the rigidity of said connection component 57. In addition, besides using components that simply act to make electrical connections, electronic components such as IC and so forth may also be used for connection component 57.

The following provides an explanation of coil substrate 20.

Although the entire coil substrate 20 is not shown, in the case of fabricating this coil substrate 20, a base substrate 59 of a length nearly equal to base substrate 54 for the above-mentioned circuit substrate 30 is made available as shown in FIG. 5. This base substrate 59 is composed by linking together six separate portions 60 into a single unit in the same manner as base substrate 54 for circuit substrate 30. As shown in the drawing, two armature coils 22 each are affixed, grouped together in units, on these six separate portions 60, thus making the total number of armature coils 22 arranged in a row on base substrate 59 twelve. Furthermore, as shown in FIGS. 5 and 2, marks in the form of broken lines 61 are printed on the top and bottom surfaces of base substrate 59 to distinguish these separate portions 60. As shown in FIG. 5, coil substrate 20 is formed by joining and connecting a single separate portion 60, separated from another base substrate not shown, to one end of this unseparated base substrate 59. Furthermore, in FIG. 5, reference numeral 60a indicates connection terminals provided on said each separate portion 60.

Furthermore, in the description thus far, although two armature coils 22 each and a drive circuit for driving said armature coils 22 are separated into units with respect to coil substrate 20 and circuit substrate 30, three or more armature coils and their drive circuit may also be separated into their respective units. In addition, although base substrate 59, which supports twelve armature coils 22, and base substrate 54, on which a plurality of drive circuits are arranged in a row corresponding to two of these armature coils 22 each, are made available during fabrication of the drive unit equipped with a total of fourteen armature coils 22 in the present embodiment, it is only natural that the setting of the total length of these base substrates 54 and 59, namely the numbers of armature coils and drive circuits to be equipped on these, can be suitably changed.

In addition, although coil substrate 20 and circuit substrate 30 are composed by separating at least one of separate portions 35 and 60 provided on base substrates 54 and 59, and joining it to unseparated base substrates 54 and 59 in the present embodiment, in the case the operating stroke of the drive unit to be fabricated is shorter than the total length of base substrates 54 and 59, at least one of each of separate portions 35 and 60 provided on each of said base substrates 54 and 59 should be cut away as necessary. Thus, a substrate of desired length can be easily obtained by cutting off one separate portion from the base substrate and joining to another unseparated base substrate, or simply removing a portion of the base substrate. In addition, the remaining portion of the base substrate from which a portion has been cut away as mentioned above can also be used in other applications in any state.

As shown in FIGS. 3 and 5, coil substrate 20 and circuit substrate 30, which are arranged to be mutually separated by bed 1 and coil yoke 3, are connected by connecting a plurality, in this case seven, of connection devices in the form of both corresponding male and female connectors 63 and 64 provided on mutually opposing sides of both said substrates. One each of these connectors 63 and 64 is arranged with respect to each separate portion 35 and 60 each provided with two armature coils 22 and their drive circuit grouped into a unit as previously described. As shown in FIG. 3, said connectors 63 and 64 are mutually connected through apertures 1e and 3e formed in bed 1 and coil yoke 3. Thus, since one each of connectors 63 and 64 is provided for each of separate portions 35 and 60 of coil substrate 20 and circuit substrate 30, when mutually assembling both said separate portions 35 and 60, the directions of both can be recognized both quickly and easily, thus facilitating assembly work. Furthermore, connection of corresponding both separate portions 35 and 60 may be performed by lead wires and not by connectors as described above. In addition, with respect to the number of connectors, besides providing only one connector for each of separate portions 35 and 60 as mentioned above, two or more connectors may also be provided.

On the other hand, the secondary side of the linear direct current motor is composed in the manner described below.

Figure 6:
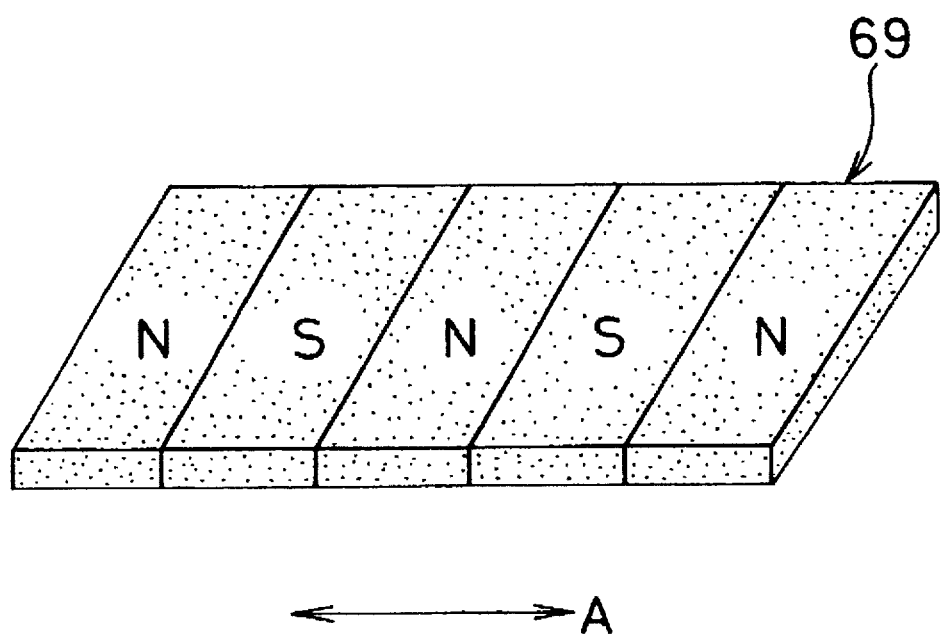
FIG. 6 is a perspective view of a field magnet that is a constituent feature of the secondary side of the drive unit shown in FIGS. 1 through 3.

As shown in FIGS. 1 and 3, said secondary side has magnet yoke 68, mounted on the lower side of table 2, and field magnet 69 anchored on the lower surface of said magnet yoke 68 to oppose each of the above-mentioned armature coils 22 of the primary side. As shown in FIG. 6, field magnet 69 is formed overall into the shape of a rectangular plate, and is arranged and magnetized so that a plurality of N and S magnetic poles, for example 5, are alternately arranged in a row in direction A in which the primary side and secondary side perform relative movement, namely the lengthwise direction of bed 1.

In said drive unit, a relative position detection device having the constitution described below is provided for detection of the relative positions of the above-mentioned bed 1 and table 2.

Namely, said relative position detection device is composed of linear magnetic scale 71 shown in FIGS. 1 through 3, and magnetic sensor portion 72 shown in FIG. 3. Said linear magnetic scale 71 extends in the direction of move- ment of the above-mentioned table 2, and together with a large number of N and S magnetic poles being alternately magnetized at a precise pitch along its lengthwise direction, an origin signal magnetized portion is formed on one end. On magnetic sensor portion 72, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement. Furthermore, as shown in FIGS. 1 and 3, cables in the form of flexible substrates 74 for obtaining signals from the above-mentioned magnetic sensor portion 72, and cover 75, which covers said flexible substrates 74, are provided.

In the drive unit having the above-mentioned constitution, by supplying a prescribed excitation current to each armature coil 22, thrust is generated based on Fleming's left hand rule between the primary and secondary sides. For example, if bed 1, to which the primary side is coupled, is taken to be the stationary side, table 2, integrated into a single unit with the secondary side, is moved by this thrust. Moreover, the position of table 2 with respect to bed 1 is detected by the relative position detection device described above.

Furthermore, although the above has provided an explanation of the constitution of a drive unit in the form of a direct current linear motor in an object measuring apparatus, probe unit 80 is fastened to the upper surface of the above-mentioned table 2 by bolts that screw into threaded holes 2c. This probe unit 80 is composed of plate-shaped portion 81 fastened to table 2, and probe portion 82 rising vertically with respect to plate-shaped portion 81, and measuring position detection sensor (touch sensor) 83 is mounted on this probe portion 82 by a differential transformer system, electrical current system or piezoelectric device.

Figure 13:
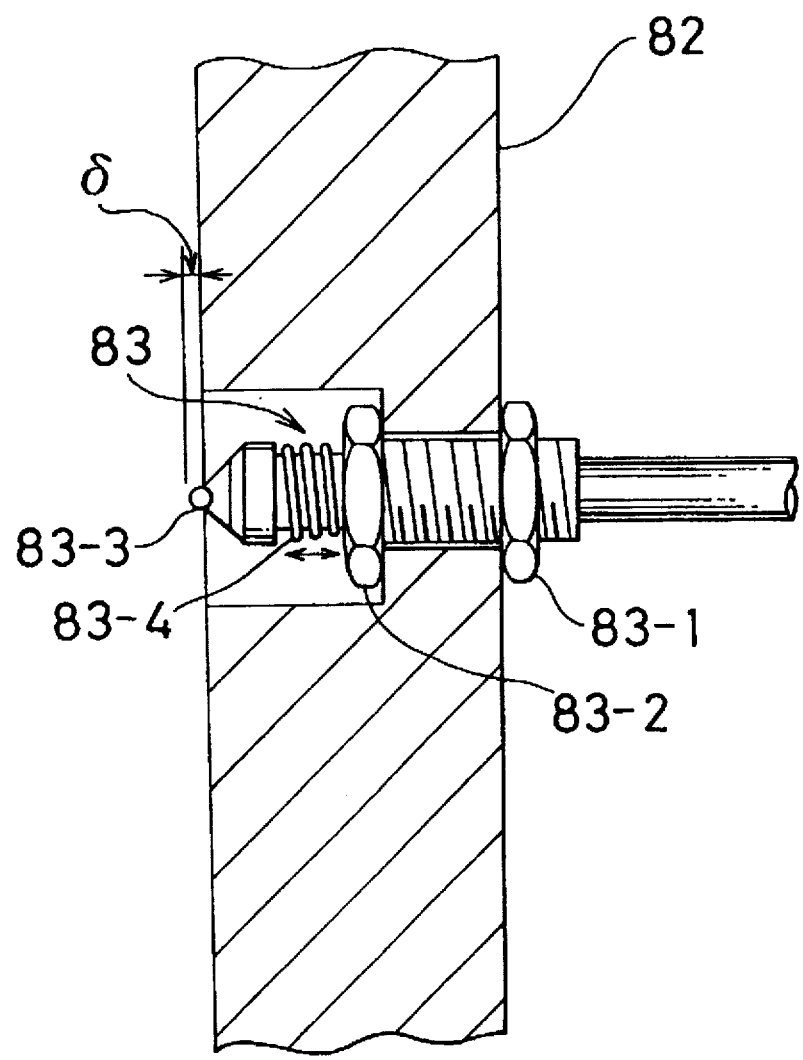
FIG. 13 is a drawing indicating a touch sensor-type measuring position detection sensor mounted on a probe.

As is described later, this measuring position detection sensor 83 generates an electrical output when an object to be measured is measured, and that electrical output is led out from the above-mentioned magnetic sensor portion 72 by means of flexible board 74 that serves to obtain signals from the above-mentioned magnetic sensor portion 72. FIG. 13 indicates the state of touch sensor type of measuring position detection sensor 83 attached to probe portion 82. This measuring position detection sensor 83 is fixed in an arbitrary position by two nuts 83-1 and 83-2. In addition, ball 83-3 attached on the end while able to rotate is composed to as to be turned on and off as a result of touching the object to be measured, and is composed to be able to be extended and contracted in the direction of the arrows by spring 83-4.

Figure 7:
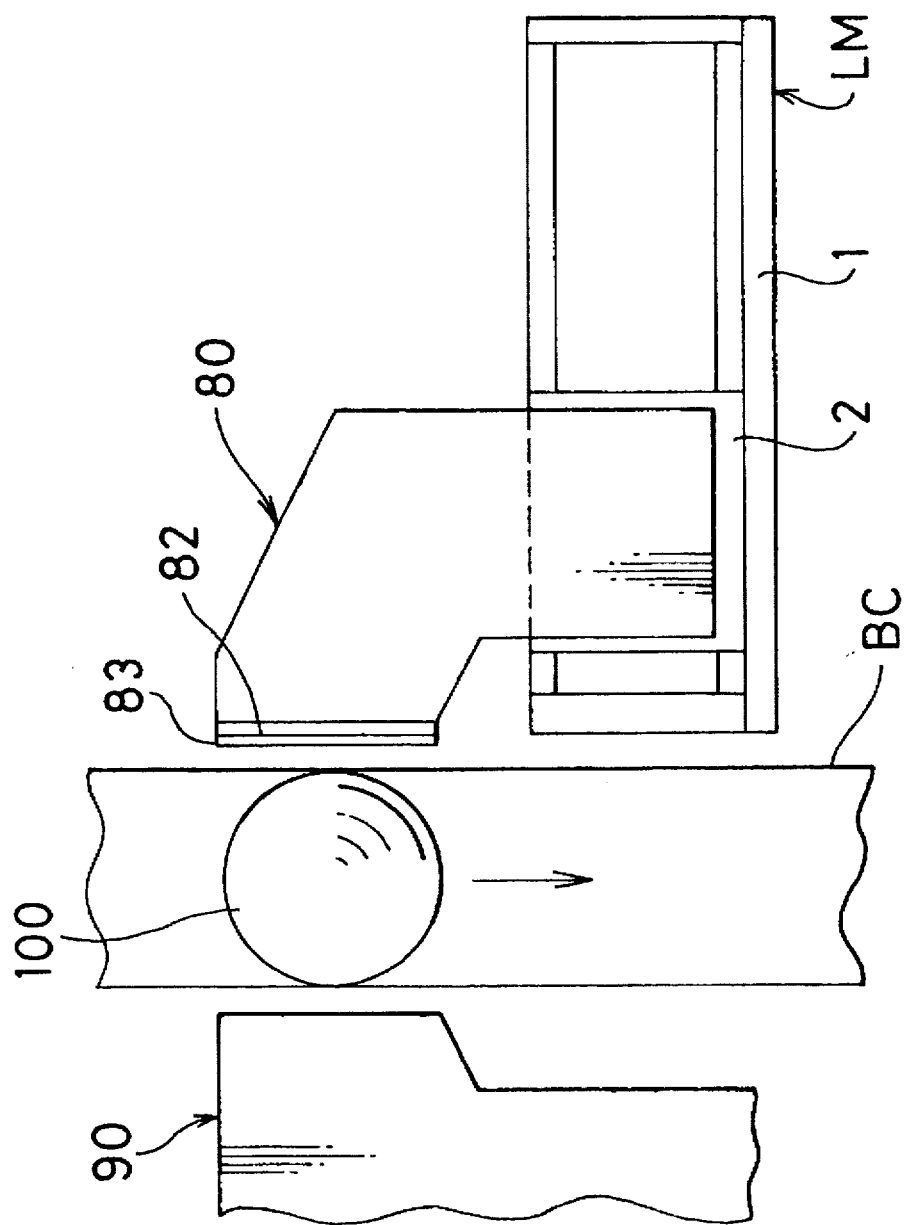
FIG. 7 is an overhead view indicating an object measuring apparatus using the drive unit shown in FIGS. 1 through 3.

FIG. 7 indicates the state of an object measuring apparatus composed using drive unit LM by a direct current linear motor composed as described above. Namely, drive unit LM is fastened to a mounting base (not shown) of the measuring apparatus by bolts inserted into insertion holes 1c formed in bed 1. Reference numeral 100 in FIG. 7 indicates a single measured object that is placed and sequentially transported on a transport table that moves in the direction of the arrow, namely belt conveyor BC, and the state in which a cylindrical product is located at the measuring position is illustrated in FIG. 7.

As shown in the drawing, drive unit LM in the form of a direct current linear motor is arranged so that its lengthwise direction is in the direction vertical to the direction of transport on belt conveyor BC. Thus, probe portion 82 of probe unit 80 fastened to the upper surface of the above-mentioned table 2 approaches in the direction vertical to the direction of transport of measured object 100 to make contact with measured object 100. At this time, an electrical signal, namely a pulse output, proportional to the amount of movement of probe unit 80 is generated by a relative position detection unit composed of linear magnetic scale 71 arranged on the bed 1 side, and magnetic sensor portion 72 arranged on the table 2 side. This pulse output is supplied to a processing unit to be described later.

On the other hand, stationary probe unit 90 is attached to the mounting base of the measurement apparatus so as to oppose the above-mentioned probe unit 80 fastened to drive unit LM. Thus, measured object 100 is clamped by first probe unit 80 driven by drive unit LM and stationary second probe unit 90. Furthermore, this second probe unit 90 may also be able to be moved by a cylinder and so forth.

The pushing pressure (thrust) applied to measured object 100 by first probe unit 80 driven by drive unit LM is nearly proportional to the drive current supplied to armature coils 22 in drive unit LM, and by regulating this drive current, the pushing pressure (thrust) of the probe on measured object 100 can be controlled to an arbitrary value, such as a suitable value on the order of 100 grams.

When measured object 100 is clamped by first and second probe units 80 and 90, a detection output is generated by measuring position detection sensor 83 provided on first probe unit 80. This detection output is supplied to a processing unit to be described later.

Figure 8:
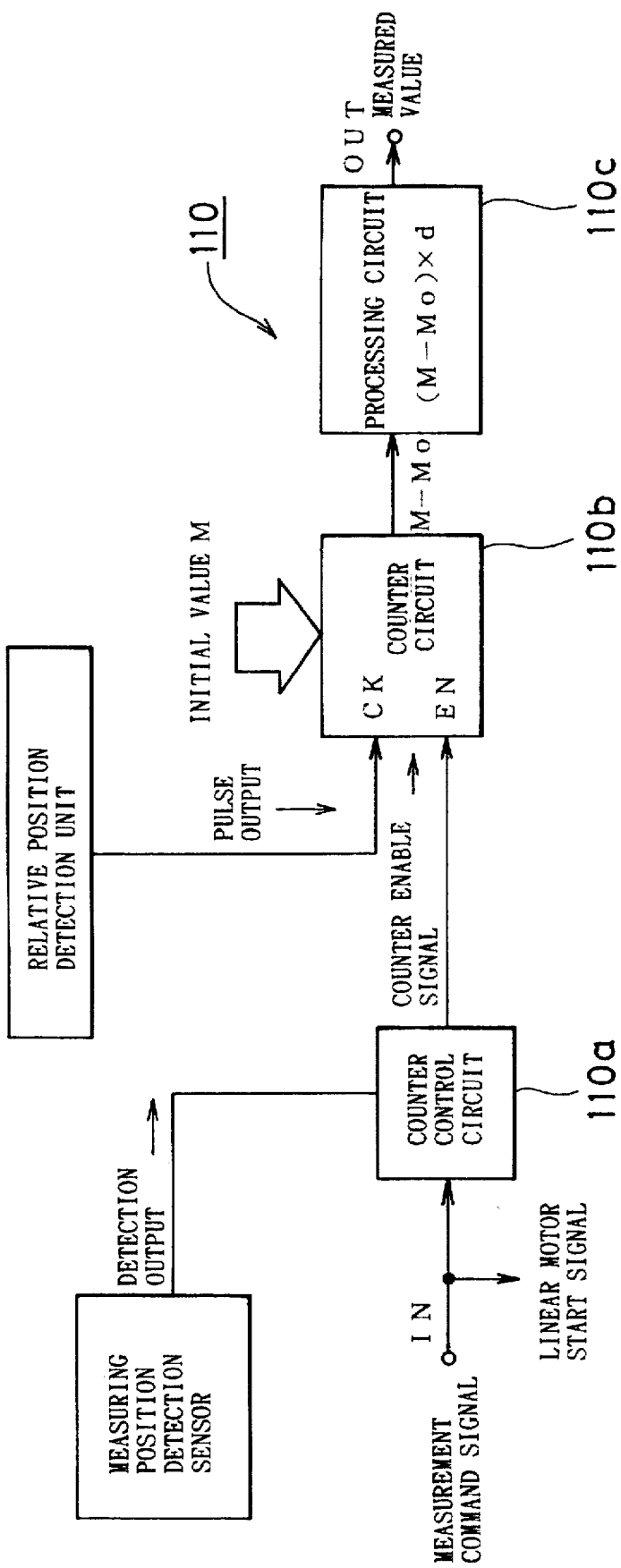
FIG. 8 is a block diagram indicating the processing unit used in the object measuring apparatus shown in FIG. 7.

FIG. 8 indicates an example of processing unit 110 that calculates the outer dimensions of measured object 100 based on the electrical signal output by the above-mentioned relative position detection units 71 and 72. This processing unit is basically composed of counter control circuit 110a, counter circuit 110b and processing circuit 110c.

Firstly, a measurement command signal is supplied to counter control circuit 110a. This measurement command signal is supplied in the state in which measured object 100 placed on a transport table, namely belt conveyor BC, is located at the measuring position. This measurement command signal is used as the start signal of a drive unit in the form of linear motor LM. When a measurement command signal is supplied to counter control circuit 110a, counter control circuit 110a generates a counter enable signal. In addition, as a result of being composed such that a detection output from measuring position detection sensor 83 provided on probe unit 80 is also supplied to counter control circuit 110a, when a detection signal is received from measuring position detection sensor 83, counter control circuit 110a stops the output of the counter enable signal.

The counter enable signal generated from the above-mentioned counter control signal 110a is supplied to enable terminal EN of counter circuit 110b causing counter circuit 110b to enter the enable state. On the other hand, a pulse output from the relative position detection unit, composed of linear magnetic scale 71 arranged on the above-mentioned bed 1 side and magnetic sensor portion 72 arranged on the table 2 side, is supplied to counter circuit 110b, and this is input to clock input terminal ck of counter circuit 110b.

In addition, initial value M that indicates the home position of the probe is either entered into counter circuit 110b from the outside using a keyboard and so forth, or is set in advance in counter circuit 110b. Counter circuit 110b then counts down according to the pulse output from the relative position detection unit that is input to clock input terminal ck from initial value M.

Counter circuit 110b supplies the count value (M-Mo) to processing circuit 110c in the state in which the counter enable signal to counter circuit 110b is no longer present. In processing circuit 110c, the outer shape of the measured object is calculated based on offset value $\alpha$ between the location of the probe and the location of the relative position detection unit, and pitch interval d of the electrical output in the relative position detection unit, namely the magnetized pitch interval of linear magnetic scale 71, and is then output as the measured value.

Figure 9:
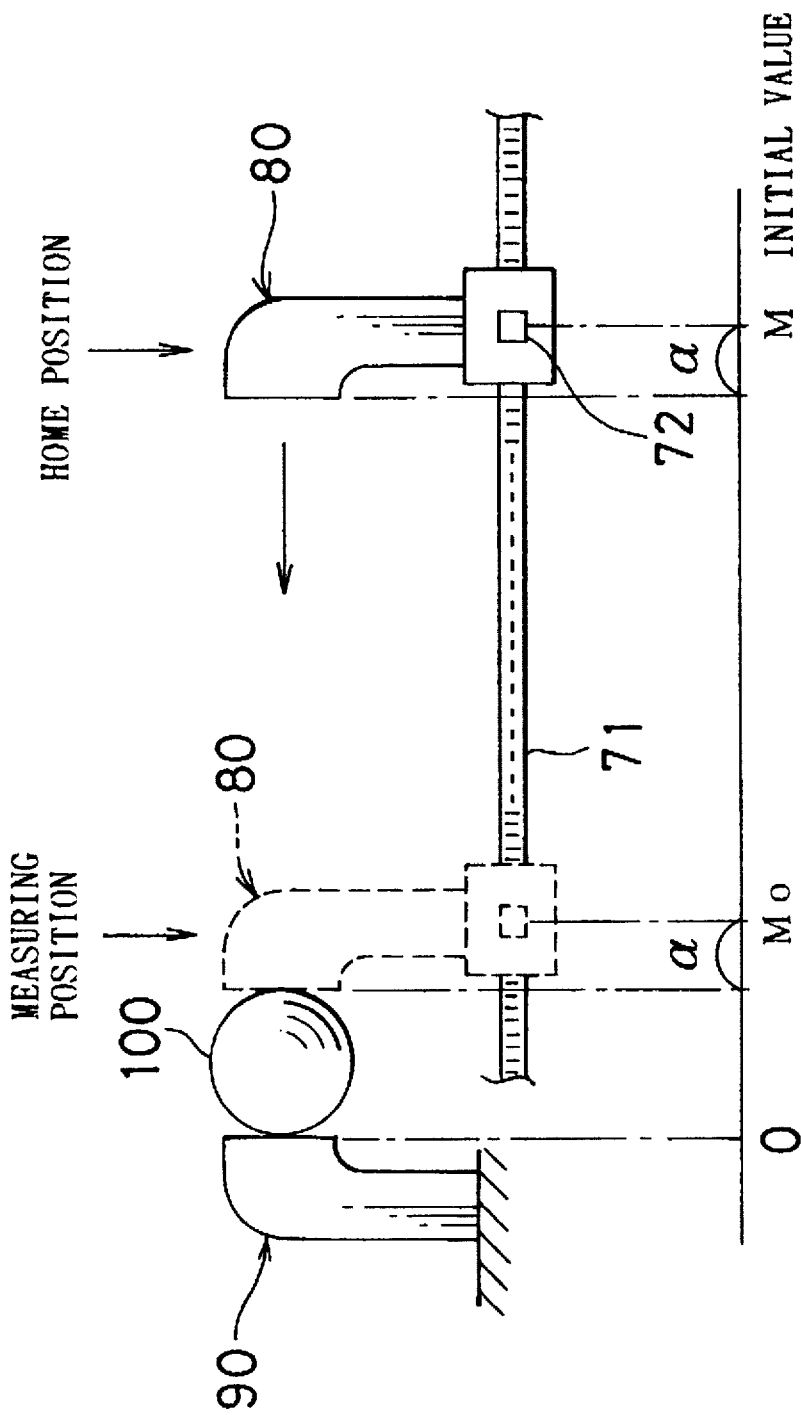
FIG. 9 is a schematic drawing for explaining the action of the processing unit shown in FIG. 8.

The processing action of this processing unit 110 is explained based on FIG. 9. Namely, probe unit 80, depicted with solid lines, indicates the location of home position M of the probe in the case of starting measurement of the outer dimensions of measured object 100. Here, when a measurement command signal is supplied to counter control circuit 110a, a counter enable signal is output to counter control circuit 110b by counter control circuit 110a, and counter control circuit 110b enters the state that enables counting operation. Simultaneous to this, a drive unit in the form of linear motor LM starts and as a result, probe unit 80 moves toward measured object 100. At this time, the pulse output generated from the relative position detection unit is supplied to counter circuit 110b, and counter circuit 110b begins to count down from initial value M.

When the state is reached in which probe unit 80 makes contact with measured object 100 causing it to be clamped between the first and second probes, namely when it reaches the location of probe unit 80 indicated with the broken line in the drawing, a detection output from measuring position detection sensor 83 is supplied to counter control circuit 110a, counter circuit 110b stops counting down, and the count value (M-Mo) is supplied to processing circuit 110c. Since the offset value $\alpha$ between the location of the probe and the location of the relative position detection unit, and the pitch interval of the electrical output in the relative position detection unit, namely magnetized pitch interval d of linear magnetic scale 71, are stored in advance in processing circuit 110c, processing circuit 110c performs the calculation $\{(M-\alpha)-(Mo-\alpha)\}\times d$, namely $(M-Mo)\times d$, based on these values followed by output of that result in the form of the measured value. This measured value is either displayed on, for example, a display unit or stored in a data recorder and so forth.

Figure 10:
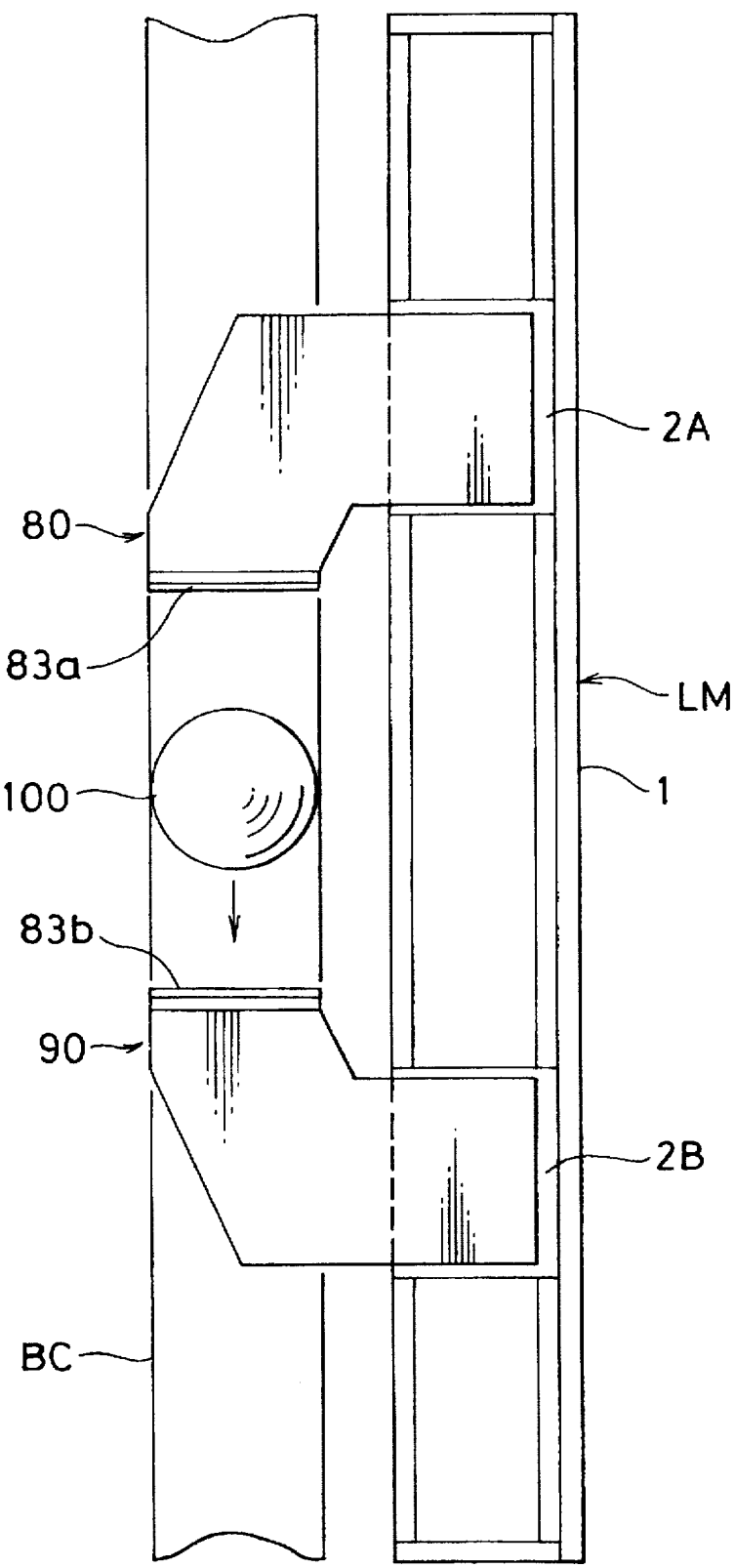
FIG. 10 is an overhead view indicating another embodiment of an object measuring apparatus using the drive unit shown in FIGS. 1 through 3.

FIG. 10 indicates another embodiment of the object measuring apparatus of the present invention. In this example, moving members in the form of two tables 2A and 2B are equipped on a base member in the form of bed 1. First and second probe units 80 and 90 are respectively attached to these tables so as to be mutually opposed. The lengthwise direction of bed 1 is arranged to be in parallel with the direction of transport of a transport table, namely belt conveyor BC, that transports measured object 100. This embodiment is composed so that thrust is applied to probe units 80 and 90 so that transported measured object 100 is clamped by probe units 80 and 90 from the outside on both sides in the direction of transport.

Thus, in the example shown in FIG. 10, probe unit 80, to which thrust is applied in the same direction as the direction of forward movement of the transported measured object 100, follows the movement of measured object 100, while probe unit 90, to which thrust is applied so as to oppose the direction of movement of measured object 100, is controlled so as to oppose the movement of measured object 100.

In the example shown in FIG. 10, the above-mentioned measuring position detection sensors 83a and 83b are respectively attached to the two probe units 80 and 90, and processing unit 110 is composed so as to calculate the outer dimensions of measured objects based on the count value at the time of generation of outputs from these two measuring position detection sensors 83a and 83b.

According to this example, it is possible to measure the outer dimensions of measured object 100 during transport that is placed on a transport table, for example, belt conveyor BC. However, it may also be measured by stopping belt conveyor BC in the state in which measured object 100 makes contact with probe unit 90, and then moving the other probe unit 80.

Figure 11:
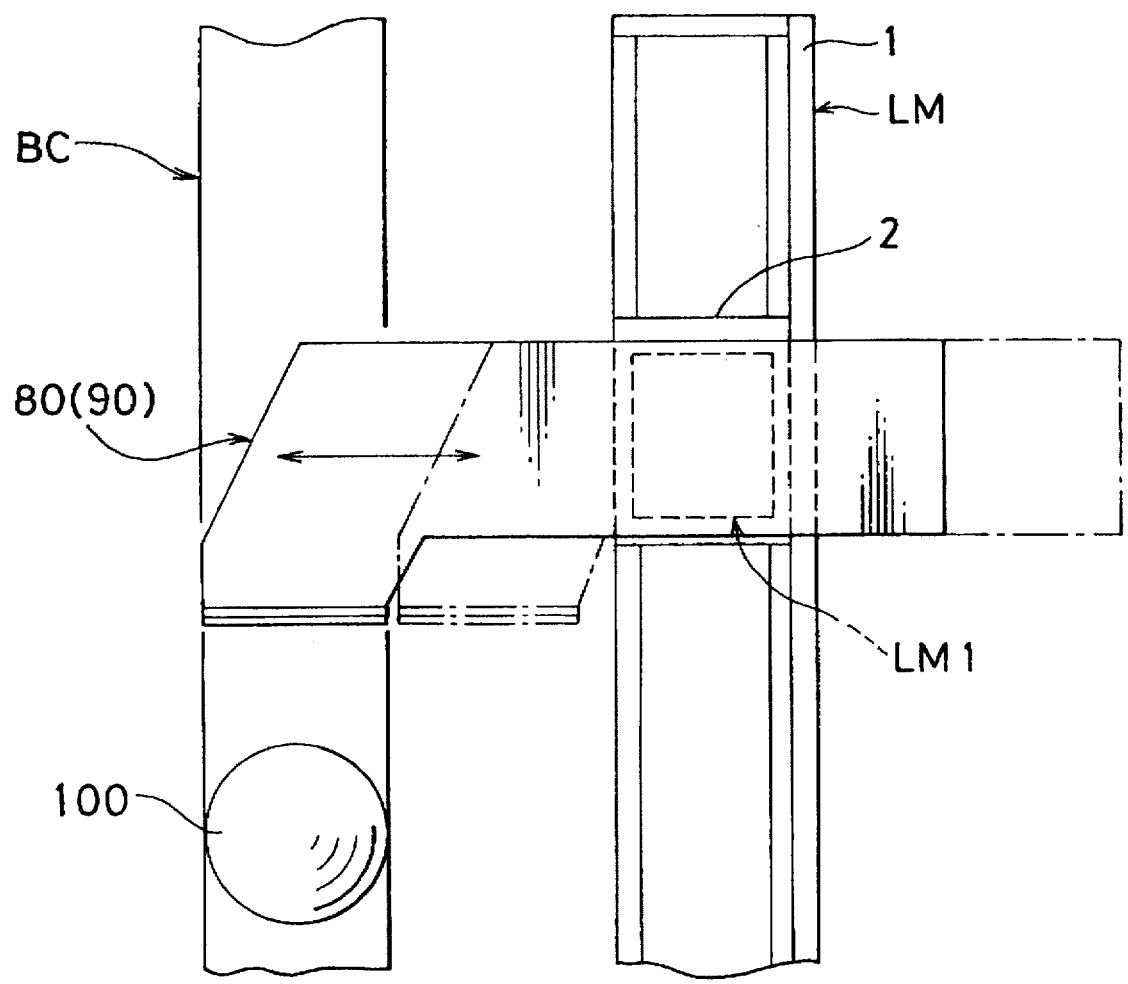
FIG. 11 is an overhead view indicating an example of the operation of the probe unit applied in the object measuring apparatus composed as shown in FIG. 10.

In the example indicated in FIG. 10, probe units 80 and 90 obstruct the transport of the object when measurement is not being performed. Therefore, FIG. 11 indicates an example of a constitution in which probe units 80 and 90 are able to evade the object transport path. Namely, probe units 80 and 90 are attached to a second linear motor LM1 that is driven in the direction perpendicular to the lengthwise direction of belt conveyor BC, and the base of this second linear motor LM1 is composed to be attached to the above-mentioned moving member in the form of table 2. Furthermore, a constitution may also be employed wherein probe units 80 and 90 protrude and retract by using a cylinder and so forth instead of using second linear motor LM1.

Figure 12A:
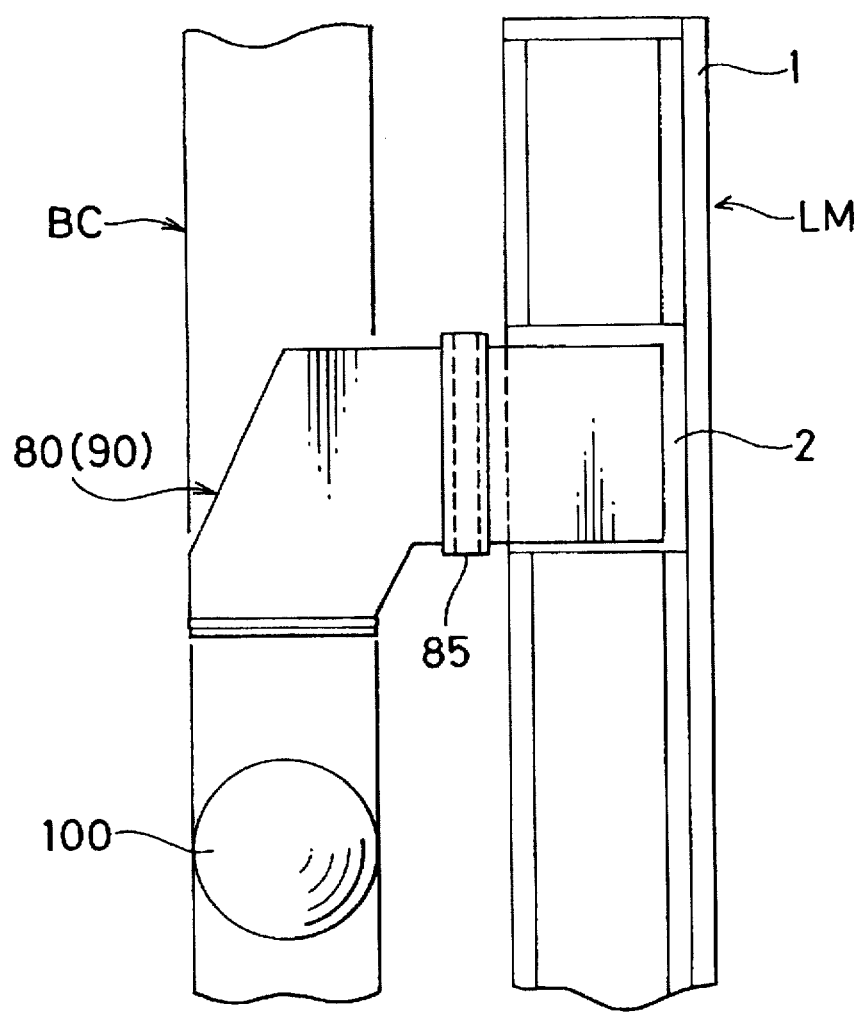
FIGS. 12 (A) and (B) are overhead views indicating an example of operation of another probe unit applied in the object measuring apparatus composed as shown in FIG. 10.
Figure 12B:
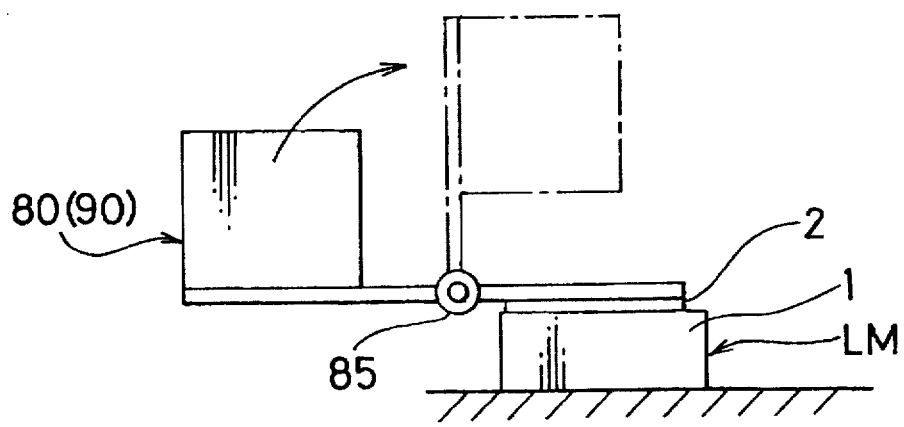

As a result, when the direction of movement of table 2 with respect to bed 1 is tentatively taken to be direction X, probe units 80 and 90 attached to second linear motor LM1 are able to move in direction Y. Thus, second linear motor LM1 operates and probe units 80 and 90 are able to protrude in direction Y, namely onto the transport path as shown in the drawing with the solid line, only when measuring measured object 100 on the transport table. In addition, as shown in, for example, FIGS. 12(A) and (B), the above-mentioned probe units 80 and 90 can be composed to jump up in the perpendicular direction by coupling 85, and be able to return to the horizontal direction as shown in the drawings with the solid line only when measuring the outer shape of measured object 100.

Although an example of the relative position detection unit in the above explanation is shown to be composed of a combination of linear magnetic scale 71 arranged on the bed 1 side, and magnetic sensor portion 72 arranged on the table 2 side, instead of this constitution, another possible constitution is that in which, for example, a linear optical scale, in which light passing slits are formed at equal intervals, is arranged on the bed 1 side, and a photosensor portion, which detects light that passes through the light passing slits of the linear magnetic scale and converts that light into an electrical pulse, is arranged on the table 2 side. The location of the probe should naturally be provided on the side near the above-mentioned relative position detection scale to minimize measurement error.

Furthermore, in the above-mentioned embodiment, although a constitution is employed that mainly measures the outer shape of an object, it goes without saying that the inner shape of an object can also be measured by, for example, changing the mounting form of probe units 80 and 90.

Figure 14:
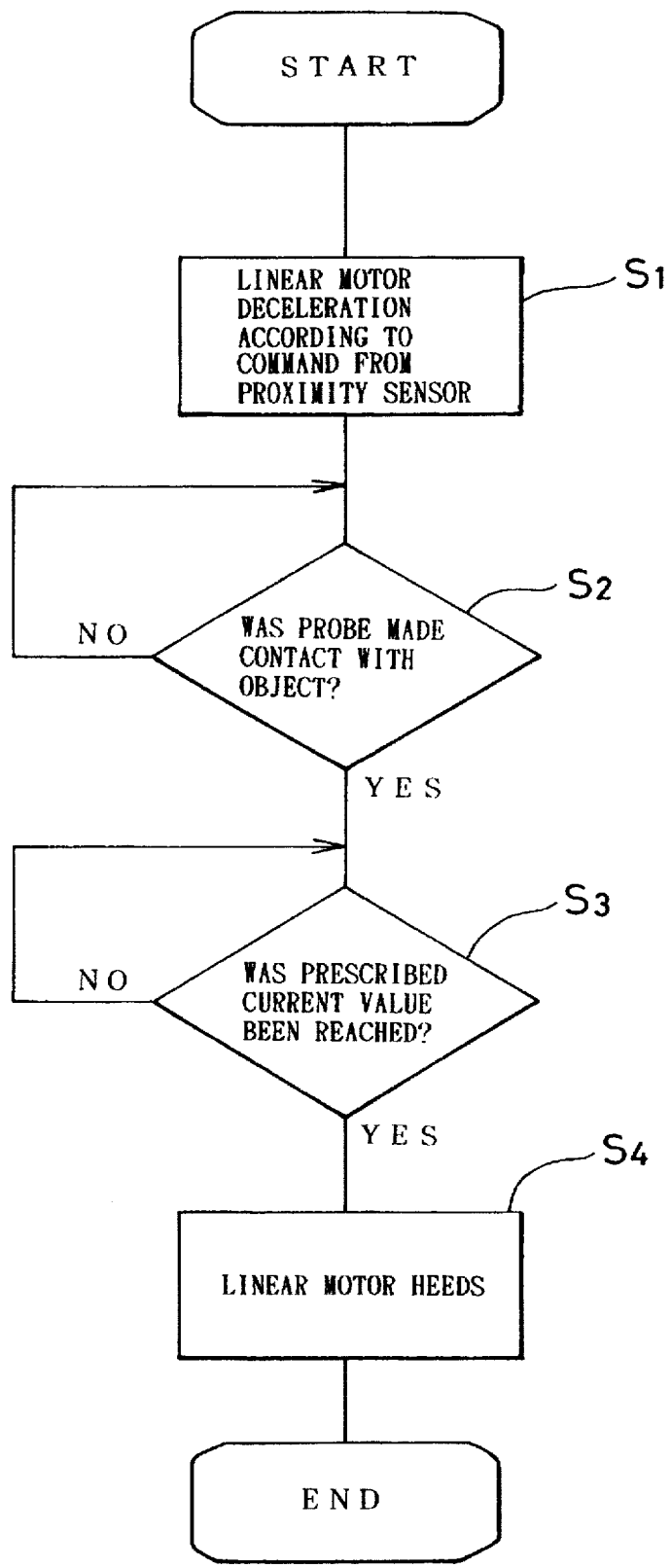
FIG. 14 is a flow chart in the case of controlling the speed of a linear motor using a proximity sensor.

In addition, measurements can be made with even greater accuracy by controlling speed until measurement by attaching a proximity sensor, decelerating at a point just before the probe makes contact with the object and controlling to a prescribed measuring load after contact is made. Namely, as shown in FIG. 14, proximity of probe portion 82 to the measured object is detected by a command from a proximity sensor (not shown) attached to probe section 82 shown in FIG. 7. Processing circuit 110 shown in FIG. 8 then decelerates the linear motor (Step $S_1$). Next, a judgment is made as to whether or not the probe has made contact with the measured object (Step $S_2$). When it has not made contact, the judgment of Step $S_2$ is repeated, and when it has made contact, a judgment is made as to whether or not a prescribed current value has been reached (Step $S_3$). In the case the prescribed current value has been reached, namely in the case it has been judged that a prescribed current has been reached by setting a command input voltage for a rated thrust on the linear motor side and performing control of that thrust, processing circuit 110 holds the linear motor as a result of judging that the prescribed measurement load has been reached (Step $S_4$). After holding of the linear motor, the article is measured in accordance with the circuit shown in FIG. 8.

As is clear from the above-mentioned explanation, according to the object measuring apparatus as claimed in the present invention, since a probe unit is composed so as to be driven by a drive unit composed of armature coils and a field magnet arranged so as to be magnetically coupled between a base member and moving member, the pushing pressure (thrust) applied to the measured object by the probe unit can be finely controlled by regulating the drive current supplied to the armature coils.

Thus, the present invention is able to eliminate the problem of causing damage to products by excessive pushing pressure applied by the probe in the manner of the probe driving device of the prior art that uses a mechanical speed reducer such as a ball screw.

In addition, according to the present invention, since an object measuring apparatus can be composed without requiring a special measuring apparatus by using a relative position detection unit equipped on a drive unit, the present invention can be composed inexpensively with a small number of parts.

In addition, according to the present invention, since a linear motor is decelerated by a command from a proximity sensor, and a judgment is made that a prescribed measuring load has been reached after the probe makes contact with a measured object thereby causing the linear motor to stop, measurement can be performed with greater accuracy.

What is claimed is:

1. An object measuring apparatus comprising:
   an elongated base member;
   a moving member mounted on said base member so as to be able to be freely moved reciprocally with respect to a lengthwise direction of said base member by a guiding device that guides by rolling;
   a drive unit comprising a linear motor that drives said moving member by the magnetic effects of armature coils and a field magnet between and respectively arranged on said base member and said moving member;
   a relative position detection unit arranged between said base member and said moving member that outputs an electrical signal indicating the relative position of said moving member with respect to said base member;
   a probe that measures the dimensions of an object, said probe having a measuring position detection sensor that detects said object, said sensor being arranged on said moving member; and
   a processing unit that calculates the dimensions of the object based on a detection output from said measuring position detection sensor indicating that an object has been detected, and on the electrical signal output by said relative position detection unit as a result of a driving operation of said linear motor.

2. An object measuring apparatus as set forth in claim 1 wherein said linear motor has said armature coils arranged on said base member, and said field magnet is arranged on said moving member.

3. An object measuring apparatus as set forth in claim 1 wherein said relative position detection unit comprises a linear magnetic scale magnetized at uniform intervals and arranged in a lengthwise direction of said base member, and a magnetic sensor portion on said moving member that detects magnetic flux from said linear magnetic scale.

4. An object measuring apparatus as set forth in claim 3 wherein said processing unit performs the following calculation for determining the dimensions of the object to be measured:

$$\{(M-\alpha)-(Mo-\alpha)\} \times d$$

where

M is an initial value that indicates a home position of said probe, $\alpha$ is an offset value between the location of said probe and the location of said relative position detection unit, Mo is a count value generated by said relative position detection unit when said probe has made contact with the object, and d is a pitch interval of magnetic poles of said linear magnetic scale.

5. An object measuring apparatus as set forth in claim 1 wherein said relative position detection unit comprises a linear optical scale, said linear optical scale comprising light passing slits formed at equal intervals and arranged in a lengthwise direction of said base member on said base member, and a photosensor portion that detects light that passes through the light passing slits of said linear optical scale and converts the light into an electrical signal, said photosensor portion being provided on said moving member.

6. An object measuring apparatus as set forth in claim 5 wherein said processing unit performs the following calculation for determining the dimensions of the object to be measured:

$$\{(M-\alpha)-(Mo-\alpha)\} \times d$$

where

M is an initial value that indicates a home position of said probe, $\alpha$ is an offset value between the location of said probe and the location of said relative position detection unit, Mo is a count value generated by said relative position detection unit when said probe has made contact with the object, and d is a pitch interval of said light passing slits.

7. An object measuring apparatus as set forth in claim 1 wherein said measuring position detection sensor comprises a proximity sensor, said proximity sensor outputting a signal indicating that said probe is about to make contact with the object.

8. An object measuring apparatus as recited in claim 7, wherein, in response to the signal output by said proximity sensor, said processing unit controls said linear motor to decelerate said probe.

9. An object measuring apparatus as recited in claim 8, wherein, after said probe makes contact with the object, said processing unit outputs an operating command to stop said probe when a drive current in said linear motor reaches a predetermined level corresponding to a predetermined pushing force of said probe against the object.

10. An object measuring apparatus as recited in claim 1, wherein said processing unit controls a pushing force of said probe against the object based on an amount of current applied to the armature coils of said linear motor.

11. An object measuring apparatus as recited in claim 10, wherein said processing unit calculates the dimensions of the object after said pushing force reaches a predetermined level.

12. An object measuring apparatus comprising:

an elongated base member;

two moving members mounted on said base member so as to be able to be freely moved reciprocally with respect to a lengthwise direction of said base member by a guiding device that guides by rolling;

a drive unit comprising a linear motor that drives said two moving members by the magnetic effects of armature coils and a field magnet between and respectively arranged on said base member and said two moving members;

a relative position detection unit arranged between said base member and said two moving members that outputs an electrical signal indicating the respective relative positions of said two moving members with respect to said base member;

a first probe and a second probe that measure the dimensions of an object, said first probe and said second probe each having a measuring position detection sensor that detects a surface of the object, said first probe and said second probe being respectively arranged on said two moving members; and a processing unit that calculates the dimensions of the object based on a detection output from said measuring position detection sensor of each probe indicating that an object has been detected, and on the electrical signal output by said relative position detection unit as a result of a driving operation of said linear motor.

13. An object measuring apparatus as recited in claim 12, wherein said processing unit controls a pushing force of said first probe and said second probe against the object based on an amount of current applied to the armature coils of said linear motor.

14. An object measuring apparatus as recited in claim 13, wherein said processing unit calculates the dimensions of the object after said pushing force reaches a predetermined level.

* * * * *